US011875778B1

(12) United States Patent
Raviv et al.

(10) Patent No.: US 11,875,778 B1
(45) Date of Patent: Jan. 16, 2024

(54) SYSTEMS AND METHODS FOR VOICE RENDERING OF MACHINE-GENERATED ELECTRONIC MESSAGES

(71) Applicant: Yahoo Assets LLC, New York, NY (US)

(72) Inventors: Ariel Raviv, Haifa (IL); Avihai Mejer, Atlit (IL)

(73) Assignee: Yahoo Assets LLC, New York, NY (US)

( * ) Notice: Subject to any disclaimer, the term of this patent is extended or adjusted under 35 U.S.C. 154(b) by 647 days.

(21) Appl. No.: 16/685,522

(22) Filed: Nov. 15, 2019

(51) Int. Cl.
| | |
|---|---|
| G10L 13/00 | (2006.01) |
| G10L 13/08 | (2013.01) |
| G10L 13/047 | (2013.01) |
| G06F 9/451 | (2018.01) |
| G06F 16/245 | (2019.01) |
| G06F 40/295 | (2020.01) |

(52) U.S. Cl.
CPC ............ *G10L 13/047* (2013.01); *G06F 9/453* (2018.02); *G06F 16/245* (2019.01); *G06F 40/295* (2020.01); *G10L 13/00* (2013.01); *G10L 13/08* (2013.01)

(58) Field of Classification Search
None
See application file for complete search history.

(56) References Cited

U.S. PATENT DOCUMENTS

| | | | | |
|---|---|---|---|---|
| 10,657,158 | B2 * | 5/2020 | Sheng | G06F 16/93 |
| 2012/0072439 | A1 * | 3/2012 | Driscoll | G06F 16/25 |
| | | | | 707/765 |
| 2018/0365318 | A1 * | 12/2018 | Yi | G06F 16/334 |
| 2019/0391985 | A1 * | 12/2019 | Vashist | G06F 40/40 |
| 2020/0257714 | A1 * | 8/2020 | Grabovitch-Zuyev | |
| | | | | G06N 20/00 |
| 2020/0257726 | A1 * | 8/2020 | Raviv | H04L 51/42 |
| 2021/0081613 | A1 * | 3/2021 | Begun | G06N 20/00 |
| 2021/0133216 | A1 * | 5/2021 | Meyerzon | G06F 16/24573 |
| 2023/0252020 | A1 * | 8/2023 | Korpman | G06F 40/295 |
| | | | | 707/703 |

* cited by examiner

Primary Examiner — Richa Mishra
(74) Attorney, Agent, or Firm — Bookoff McAndrews, PLLC

(57) ABSTRACT

Disclosed are systems and methods for generating voice renderings of machine-generated electronic messages. The disclosed systems and methods provide a novel framework for organizing often fragmented machine-generated electronic messages and providing mechanisms for a virtual assistant to produce voice-renderings data extracted from electronic messages. The disclosed system may implement steps for receiving user queries via virtual assistants, extracting data from machine-generated electronic messages, converting the extracted data to purposeful organizational schemas, and generating human perceivable voice renderings based on the user queries and extracted data.

20 Claims, 4 Drawing Sheets

BOOKING CONFIRMATION

THANK YOU FOR BOOKING WITH NORWEGIAN.

YOU WILL NEED TO BRING VALID PHOTO ID TO CHECK IN. A VALID PASSPORT AND VISA MAY BE REQUIRED WHEN TRAVELLING TO CERTAIN DESTINATIONS. FOR MORE INFORMATION REGARDING ID REQUIREMENTS, PLEASE VISIT WWW.NORWEGIAN.COM. WE RECOMMEND THAT YOU PRINT OUT THE TRAVEL DOCUMENTS FOR YOUR FLIGHTS.

YOUR BOOKING REFERENCE IS: MCRZJB

| FLIGHT INFO | FROM/TO | CATEGORY/SEATING | LINKS |
|---|---|---|---|
| DY4546 - 17 JAN 2019 | 18:10 TEL AVIV<br>22:05 STOCKHOLM-ARIANDA | LOW FARE<br>SEATS NOT RESERVED | CHANGE FLIGHT<br>RESERVE SEATS |
| DY4545 - 29 JAN 2019 | 12:50 STOCKHOLM-ARIANDA<br>18:25 TEL AVIV | LOW FARE<br>SEATS NOT RESERVED | CHANGE FLIGHT<br>RESERVE SEATS |
| PASSENGERS | GRABOVITCH/ARLEN<br>GRABOVITCH/IRENA<br>GRABOVITCH/MELANY<br>GRABOVITCH/RYAN | | |

ADDITIONAL PRODUCTS ORDERED

PLEASE FOLLOW THE LINK ON THE RIGHT, TO VIEW YOUR PURCHASED PRODUCTS

LINKS: VIEW/ADD PRODUCTS

OTHER INFORMATION

SEE ATTACHED TRAVEL DOCUMENTS FOR MORE TRAVEL DETAILS.
YOU CAN ALSO VIEW DETAILS ONLINE.
TOTAL AMOUNT IS EUR 493.68

TO VIEW PRICE INFORMATION, SEE ATTACHED TRAVEL RECEIPT OR DOWNLOAD IT ONLINE

LINKS: VIEW RESERVATION

GET TRAVEL DOCUMENT

HOTEL AND CAR RENTAL IN STOCKHOLM-ARIANDA 

| ESTATE | COMPACT | ESTATE | SUV |
|---|---|---|---|
| VOLKSWAGEN GOLF ESTATE OR SIMILAR<br>FROM €36 / PR. DAY | VOLKSWAGEN GOLF OR SIMILAR<br>FROM €31 / PR. DAY | AUDI A6 ESTATE OR SIMILAR<br>FROM €56 / PR. DAY | SKODA YETI OR SIMILAR<br>FROM €46 / PR. DAY |
| €432 | €372 | €672 | |

*FIG. 4*

SYSTEMS AND METHODS FOR VOICE RENDERING OF MACHINE-GENERATED ELECTRONIC MESSAGES

TECHNICAL FIELD

The present disclosure relates to techniques for generating voice renderings of machine-generated electronic messages.

BACKGROUND

Email traffic has been dominated in the past decade by machine-generated messages. These are commonly created by scripts on behalf of commercial entities or organizations, and comprise more than ninety percent of non-spam internet-based mail traffic. There are numerous examples of such messages, including purchase receipts, travel reservations, events and social notifications, and more. In parallel, the past few years have introduced a surge of voice-controlled systems and devices, from cellular phones to smart speakers (e.g., Google Home, Alexa, Siri). These voice-controlled devices offer users a wide range of services via voice interfaces, such as music streaming, calendar notifications, and online shopping, along with device-to-device communication and message reading capabilities.

Some virtual assistants offer new email-reading features that read out email messages from the last 24 hours. Typically, such email reading features read through emails starting from the most recent, and stating reading from the sender and subject line. When users need more information regarding an email being read, the user can also have the virtual assistant read out the full email. However, in the case of a machine-generated email, reading out the full email content, word by word, would be ineffective. Typically, most of the contents of these email messages is general and repetitive, while only few bits and pieces contain useful information. For example, in a flight itinerary, most of the email body comprises general terms and conditions, whereas the typical user is mostly interested in a few key details, such as the booking reference number, the departure time, etc. As such, generic text summarization techniques implemented by virtual assistants produce inadequate results, because virtual assistants expect a consecutive, coherent block of text, whereas the relevant information in this case is often fragmented by overly complex formats, which include images and tables. The following disclosure provides solutions to the aforementioned technological voids.

SUMMARY OF THE DISCLOSURE

Embodiments of the present disclosure include systems and methods for generating voice renderings of machine-generated electronic messages.

According to certain embodiments, computer-implemented methods are disclosed for generating voice renderings of machine-generated electronic messages. One method may include receiving electronic messages at a server in relation to a user; determining an organizational schema of each of the plurality of electronic messages as it is received at the server; extracting data from each of the electronic messages according to a predefined template corresponding to the organizational schema determined for each electronic message; converting the extracted data into a structured entity comprising textual data according to the predefined template corresponding to the organizational schema; identifying and storing, in relation to each of the electronic messages, one or more sub-entities in the structured entity according to the predefined template; receiving a query from the user for information contained within one or more of the electronic messages of the user; identifying an organizational schema corresponding to the query received from the user; identifying one of the electronic messages received at the server in relation to the user corresponding to the identified organizational schema; looking up identified and stored sub-entities stored in relation to the identified electronic message; generating a text-snippet of text data in the one or more sub-entities stored in relation to the identified electronic message; and producing and playing a machine-voice rendering of the generated text-snippet.

According to certain embodiments, systems are disclosed for generating voice renderings of machine-generated electronic messages. One system may include a memory device that stores instructions; and at least one processor that executes the instructions and is configured for receiving electronic messages at a server in relation to a user; determining an organizational schema of each of the plurality of electronic messages as it is received at the server; extracting data from each of the electronic messages according to a predefined template corresponding to the organizational schema determined for each electronic message; converting the extracted data into a structured entity comprising textual data according to the predefined template corresponding to the organizational schema; identifying and storing, in relation to each of the electronic messages, one or more sub-entities in the structured entity according to the predefined template; receiving a query from the user for information contained within one or more of the electronic messages of the user; identifying an organizational schema corresponding to the query received from the user; identifying one of the electronic messages received at the server in relation to the user corresponding to the identified organizational schema; looking up identified and stored sub-entities stored in relation to the identified electronic message; generating a text-snippet of text data in the one or more sub-entities stored in relation to the identified electronic message; and producing and playing a machine-voice rendering of the generated text-snippet.

According to certain embodiments, non-transitory computer readable medium are disclosed for generating voice renderings of machine-generated electronic messages. One non-transitory computer readable medium comprising a memory storage device storing and one or more processors configured to execute instructions for: receiving electronic messages at a server in relation to a user; determining an organizational schema of each of the plurality of electronic messages as it is received at the server; extracting data from each of the electronic messages according to a predefined template corresponding to the organizational schema determined for each electronic message; converting the extracted data into a structured entity comprising textual data according to the predefined template corresponding to the organizational schema; identifying and storing, in relation to each of the electronic messages, one or more sub-entities in the structured entity according to the predefined template; receiving a query from the user for information contained within one or more of the electronic messages of the user; identifying an organizational schema corresponding to the query received from the user; identifying one of the electronic messages received at the server in relation to the user corresponding to the identified organizational schema; looking up identified and stored sub-entities stored in relation to the identified electronic message; generating a text-snippet of text data in the one or more sub-entities stored in relation to the identified electronic message; and producing and playing a machine-voice rendering of the generated text-snippet.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 4 depicts a graphical representation of an electronic message with emphasis being made to data elements that would be relevant to a user requesting a voice rendering of a machine-generated electronic message.

DETAILED DESCRIPTION OF EMBODIMENTS

Figure 1:
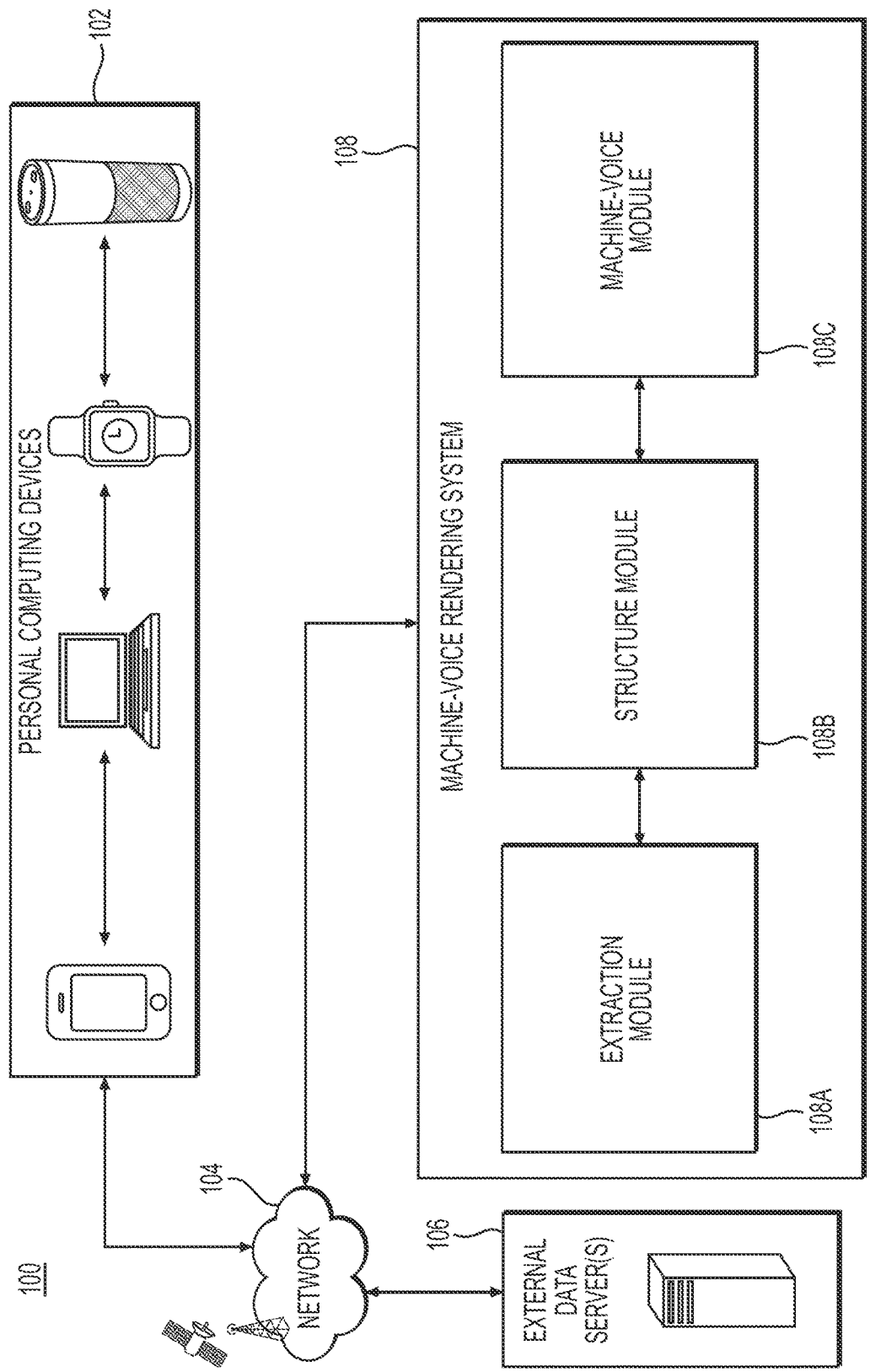
FIG. 1 is a schematic diagram illustrating an example of a computer network and environment within which the computer systems and methods disclosed herein are implemented according to some embodiments of the present disclosure.

While principles of the present disclosure are described herein with reference to illustrative embodiments for particular applications, it should be understood that the disclosure is not limited thereto. Those having ordinary skill in the art and access to the teachings provided herein, will recognize that the features illustrated or described with respect to one embodiment, may be combined with the features of another embodiment. Therefore, additional modifications, applications, embodiments, and substitution of equivalents, all fall within the scope of the embodiments described herein. Accordingly, the invention is not to be considered as limited by the foregoing description. Various non-limiting embodiments of the present disclosure will now be described to provide an overall understanding of the principles of the structure, function, and use of systems and methods for generating voice renderings of machine-generated electronic messages.

As described above, in the field of text-to-speech communications, there is a need for systems and methods configured for generating voice renderings of machine-generated electronic communication. Conventional text-to-speech methods implemented by computers or virtual assistants leverage antiquated generic text summarization techniques that are ill-suited for presenting a user with relevant information from an electronic communication muddled with uninformative text. As such, while reading out an email from a friend or a colleague may be a simple, straightforward task for a virtual assistant, a machine-generated email typically poses much difficulty. Machine-generated emails, such as travel itineraries and order confirmations, are commonly riddled with irrelevant and/or undesired information. Also, such messages often present information that is buried in overly complex formats, which include images and tables. These characteristics make it infeasible for generic text summarization and text-to-speech approaches to provide a useful audio rendering of the email content. The disclosed systems and methods provide unique steps for quickly retrieving and playing, via a voice interface, relevant information from machine-generated emails, which tend to be long and of a complex format.

Accordingly, the present disclosure is directed to systems and methods for a new voice-rendering method tailored specifically for machine-generated electronic messages. The following methods implement semi- and fully-automated techniques to extract and annotate valuable segments from electronic messages based on repetitive patterns. The pertinent information is then aggregated into a coherent summary that is read out to the user. Additionally, systems and methods are disclosed for extracting structured data extracted from electronic messages to enhance question answering mechanisms.

The machine-voice rendering system disclosed herein is configured to generate concise, fluent summaries of machine-generated electronic messages via computing device and/or virtual assistant. Additionally, the machine-voice rendering system could also answer questions regarding details within machine-generated electronic messages, and/or reply with a specific piece of information associated with an electronic message, rather than a summary. As disclosed herein, an "electronic communication" or "electronic message" may be any type of digital communication including, but not limited to, email, SMS, or other text message, transcribed video/voice calls, social media conversations, communication with a digital or artificial intelligence enabled personal assistant, and/or communication with a bot.

In one embodiment, a server corresponding to the machine-voice rendering system may receive a query from a user requesting a summary or specific details regarding an electronic message (e.g., an email) through an interface corresponding to a computing device or virtual assistant. In response to the user query, the machine-voice rendering system may perform an extraction process by which raw message data is aggregated from the electronic message and further converted into a structured entity. The structured entity may be an organizational schema for electronic messages by which the organization of the scheme corresponds to the subject matter of the content in the electronic message. A structured entity may further be comprised of an additional layer of entities (i.e., sub-entities) that conform to the organizational scheme of the structured entity and further break down content (e.g., aggregated data from an electronic message) into sub-categories according to location within the electronic message, by subject matter, grammar, syntax, tags, keywords, or the like. Such organization allows content or data to be structured in a manner that makes accessing data and data retrieval useful and predictable by applications, search engines, and queries. The machine-voice rendering system may retrieve relevant entities (i.e., specific areas, nodes, or sub-entities within the structured entity) corresponding to the structured entity based on the specific request made in the user query. Additionally, the machine-voice rendering system may receive more than one query relating to the same (or different) electronic message, for example via call-and-response communication. The retrieved relevant entities may include message data that is further relevant to the user query. The message data in the retrieved relevant entities may be analyzed and converted into a machine-readable textual snippet. A machine-voice rendering of the machine-generated electronic message may then be generated to produce a human perceivable audio output providing relevant and specific information in response to the user query.

FIG. 1 is a schematic diagram illustrating an example of a computing network 100, or environment, within which the machine-voice rendering of machine-generated electronic messages systems and methods disclosed herein are implemented according to some embodiments of the present disclosure. As shown in FIG. 1, computing network 100 may include a plurality of personal computing devices 102, external data sever(s) 106, a machine-voice rendering system 108, all in communication with one another via a network 104, such as the Internet.

The personal computing devices 102 may include virtually any desktop or portable computing device capable of receiving and sending messages over a network, such as network 104, or the like. For example, a personal computing device 102 may be a mobile phone, a tablet device, a connected Internet-of-Things device (e.g., connected appliance or connected vehicle), a desktop computer, a laptop computer, a landline phone, a gaming system, a television, smart accessory, and/or a digital or artificial intelligence enabled virtual personal assistant. Personal computing devices 102 may include virtually any portable computing device capable of connecting to another computing device and receiving information, as discussed above. Personal computing devices 102 may also be configured to execute at least one native or web-based client application (e.g., a communication application) that is configured to receive communication and/or content from another computing device. In some embodiments, a virtual assistant (e.g., a Alexa®, Portal®, or Home®) may also communicate with a server, a mobile device, or other virtual assistants (e.g., a smart speaker or smart home hub), or the like. In one embodiment, such communications may include sending and/or receiving messages or voice/video calls, searching for, viewing, and/or sharing photographs, digital images, audio clips, video clips, or any of a variety of other forms of communications. Personal computing devices 102 may be configured for sending or receiving signals, such as via a wired or wireless network, or may be configured for processing or storing signals, such as in memory as physical memory states, and may, therefore, operate as a server. Network 104 may be configured to couple personal computing devices 102 and their components with components corresponding to the travel recommendation system 110. It should be appreciated that any devices or servers of FIG. 1 may be configured to communicate with each other directly, such as through Bluetooth or any other near-field communication (NFC) protocol. Network 104 may include any of a variety of wireless sub-networks that may further overlay stand-alone ad-hoc networks, and the like, to provide an infrastructure-oriented connection for the personal computing devices 102.

In general, network 104, may include local area networks ("LANs")/wide area networks ("WANs") network, wireless network, or any combination thereof, and configured to implement protocols for transmitting data in communication computing devices accessing the machine-voice rendering system 108. Not all the components featured in FIG. 1 may be required to practice the disclosure, and variations in the arrangement and type of the components may be made without departing from the spirit or scope of the disclosure.

The external data server(s) 106 may include one or more of personal computers desktop computers, multiprocessor systems, microprocessor-based or programmable consumer electronics, database(s), network PCs, server(s), and the like, maintained by third parties storing business-to-business or business-to-consumer data (e.g. Verizon®, Microsoft®, Google®, Kayak®, Facebook®, Amazon®, a government entity, or the like). The machine-voice rendering system 108 may receive data stored on the external data server(s) 106 on one or more of its computing devices. The data stored at the external data server(s) 106 may include, but is not limited to, information related to: email, instant messaging messages, social media messages, virtual world messages (e.g., video game or virtual reality messaging), order details (e.g., cost of each item purchased, total cost of purchase, expected shipping or arrival date of each product, order number, product details, etc.) rewards information, weather, news, shipping details (e.g., expected date/time of arrival of a package, tracking number, carrier information, etc.), transportation (e.g., public and private data related to airplanes, rocket ships, trains, and aquatic vehicles), mobile devices (e.g., iPhone®), smart accessories (e.g. Apple Watch®), artificial intelligence enabled devices (e.g. Alexa®, Google Home®, Facebook Portal®, and the like), and GPS data corresponding to a user or a personal computing device 102. For example, the machine-voice rendering system 108 may receive or may be able to parse data from the external data server(s) 106 pertaining to specific user(s)/member(s)/user group(s) electronic messaging (e.g. email) in order to identify specific details and content within the electronic messaging and to further respond to user queries regarding the electronic messaging.

As shown in FIG. 1, machine-voice rendering system 108 may include an extraction module 108A, a structure module 108B, a machine-voice module 108C, and one or more database(s), processors, network interface(s), and user interface(s). In addition, machine-voice rendering system 108 may be configured to execute one or more extraction, structure, or machine-voice software modules 108A-108C based on instructions and data stored in the databases. The databases may be any type of database or memory, and may be configured to be in direct communication with the machine-voice rendering system 108.

Extraction module 108A may include one or more devices and/or execute code for extracting information from a raw message (i.e., an electronic message). Devices that may operate as an extraction module 108A may include one or more of personal computers, desktop computers, multiprocessor systems, microprocessor-based or programmable consumer electronics, network PCs, server(s), and the like. Extraction module 108A may further facilitate user access to and provide information in an auditory or visual manner for a variety of services that include, but are not limited to, e-mail services, alert/notification(s), instant messaging (IM) services, streaming and/or downloading media services, search services, photo services, web services, social networking services, news services, third-party services, audio services, video services, SMS services, MMS services, FTP services, telephony services, voice over IP (VOIP) services, gaming services, or the like. The extraction module 108A may be configured to automatically extract information from electronic messages (e.g. an email) corresponding to one or more of the aforementioned services based on data stored in a database corresponding to the machine-voice rendering system 108, external data server(s) 106, and/or information received from the personal computing devices 102.

The extraction module 208 may be configured to parse, analyze, and interpret data received from one or more personal computing devices 102, external data server(s) 106, data stored in one or more databases. The extraction module 108A may also be configured to apply manually defined extraction rules to a set of electronic messages or message templates. The extraction module 108A may also be configured to execute automated methods of generating extraction rules that further incorporate clustering machine-generated methods messages in order to extract message data. The extraction module 108A may also be configured to execute online extraction process that implement entity recognition and natural language processing methods in order to extract message data from electronic messages. Once one or more extraction rules are applied to the electronic message, the extraction module 108A may convert the extracted data into a structured entity according to an organizational schema. The extracted data may be converted to an organizational schema based on the subject matter or the content of the electronic message is directed to; therefore, the extraction module 108 may also analyze the content (e.g., text, images, attachments, etc.) of the electronic message in order to determine what type of organizational schema the structured entity should confirm to.

Structure module 108B may include one or more devices and/or execute code for retrieving relevant entities from a structural entity given a user query and generating a text snippet based on the user query and structured entity. Devices that may operate as a structure module 108B may include one or more of personal computers, desktop computers, multiprocessor systems, microprocessor-based or programmable consumer electronics, network PCs, server(s), and the like. Specifically, structure module 108B may analyze and mine the user query for information that is required to respond to the user query. The structure module 108B may classify the query according to taxonomy or keyword(s) used in the query. For example, a query comprised of taxonomy or keywords requesting information directed to a product, price, and delivery date, may be classified as a query request for order information. The structure module 108B may additionally reformulate a query to enhance question phrasing and transform the query into semantically equivalent phrasing which may assist and improve the ability of the machine-voice rendering system 108 to retrieve information during the retrieval process. For example, given the question "When will the headphones/ purchased from Amazon be delivered?", a suitable reformulation of the query into, for instance, a SQL query yielding:

SELECT orderDelivery.expectedArrivalUntil FROM entities WHERE schema.type="Order" AND seller.name LIKE "% amazon %" AND ordererdItem.name LIKE "% headphones %"

Alternatively, the answer can include a complete entity rather than a single field, for example, given the query "When is my next flight?", a suitable reformulation of the query into, for instance, a SQL query may yield:

SELECT entity FROM entities WHERE schema. type="FlightReservation" AND reservationFor.departure Time>NOW( )

The structure module 108 may additionally generate a textual response based on the requested information and the structured entity. For example, in response to a user submitting a query comprising the question "When will the headphones I purchased from Verizon be delivered?" the answer would be "the headphones you purchased from Verizon will be delivered on Monday, Mar. 24, 2014," or simply "Monday, Mar. 24, 2014." In this instance, the answer is associated with a one complete sub-entity of a structured entity. As such, the structure module 108B may generate a text snippet that contains the most useful information by fitting the data values into a predefined template according to the entity type. For example, in the case of flight reservation type of entity, the corresponding template can be:

"Flight reservation under the name <underName.name> for <reservationFor.provider.name> flight no. <reservationFor.flightNumber> from <departureAirport.name> to <arrivalAirport.name> at <departureTime>"

Thus given this template and the above example as an input, the output of the process will be the following text snippet:

"Flight reservation under the name Eva Green for Continental flight no. UA110 from San Francisco Airport to John F. Kennedy International Airport at 2017-03-04 20:15."

A structured entity template(s) may host all the data fields of the corresponding entities or a selected set as in the example above. The structured entity template(s) may be curated manually, as the number of entity types that are prevalent in email communication are limited. These entity types may include, for example, RentalCarReservation, LodgingReservation, ReservationPackage, Order, ParcelDelivery, EventReservation, Invoice, etc. Alternatively, machine learning and natural language processing techniques may be implemented to automatically generate structured entity types as trends in communication change and the need for new entity types to address subject matter and structural changes in communication arise.

A machine-voice module 108C in communication with both the extraction module 108A and structure module 108B may execute text-to-speech techniques in order to produce a human-perceivable audio output of the text snippet. The machine-voice module 108C may implement one or more synthesizer techniques in executing text-to-speech processes. For example, the machine-voice module 108C may implement: concatenation synthesis (i.e., stringing together segments of recorded speech), unit selection synthesis (i.e., requesting specific words, or unit(s) of words, such as morphemes, diphones, etc. from a database and determining the best chain of the aforementioned units in order to produce and audio output), diphone synthesis, domain-specific synthesis (i.e., concatenation of prerecorded words wherein the output is limited to a particular domain), formant synthesis (i.e., implementing additive synthesis and acoustic modeling in order to create a waveform of artificial speech), and deep learning synthesis (i.e., leveraging deep neural networks that are trained on recorded speech data in order to select frame sized speech segments). In one embodiment, the machine-voice module 108C may receive a text-snippet, execute a text-to-speech technique, and transmit data packets instructing a personal computing device 102 (i.e., a mobile device or personal assistant) to produce a machine-voice rendering of the text-snippet. In another embodiment, when a personal computing device 102 comprises both a speaker and human perceivable display, the machine-voice module 108C may both implement text-to-speech techniques and further transmit data comprising a visual representation of a text-snippet. For example, the machine-voice module 108C may transmit data packets instructing a personal computing device 102 (i.e., a mobile device or personal assistant) to produce a machine-voice rendering of the text-snippet via an audio output component (e.g., a speaker) and additionally transmit instructions to display a visual content representative of the text-snippet.

Figure 2:
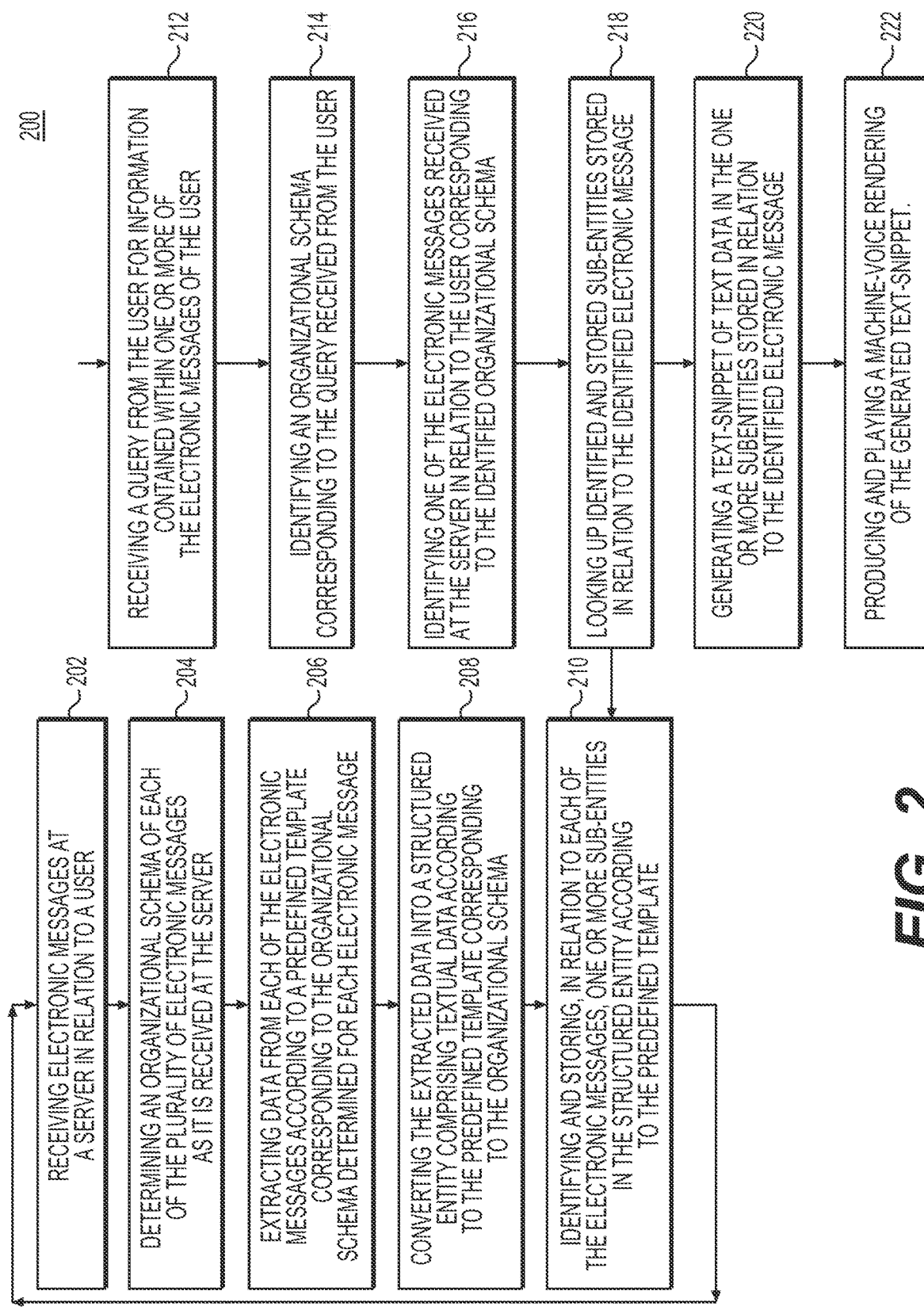
FIG. 2 is a flow diagram illustrating steps of a method for generating voice renderings of machine-generated electronic messages, performed in accordance with some embodiments of the present disclosure.

FIG. 2 is a flow diagram illustrating steps of a method for generating voice renderings of machine-generated electronic messages, performed in accordance with some embodiments of the present disclosure. As shown in FIG. 2, in one embodiment, the machine-voice rendering system 108 may be configured for receiving electronic messages at a server in relation to a user (Step 202). For example, a user may receive an email message at an email service hosted by a server. Alternatively a server may receive an electronic notification from another computing device hosting emails indicating that an email has been received.

The machine-voice rendering system 108 may then determine an organizational schema of each of the plurality of electronic messages as it is received at the server (Step 204). For example, upon receiving an electronic message, the machine-voice rendering system 108 may analyze and identify one or more of a subject matter, an attachment, and/or content of the electronic message, and compare the identified subject matter, attachments, and/or content to categories corresponding to an organizational schema(s) in order to determine which organizational schema the electronic message should be assigned to.

The machine-voice rendering system 108 may then extract data from each of the electronic messages according to a predefined template corresponding to the organizational schema determined for each electronic message (Step 206). For example, the machine-voice rendering system 108 may parse electronic messages in order to extract one or more types of data (e.g., text, images, code, etc.) and organize and prepare the extracted data for further manipulation.

The machine-voice rendering system 108 may then convert the extracted data into a structured entity comprising textual data according to the predefined template corresponding to the organizational schema (Step 208). For example, upon extracting data from the electronic message according to a set of rules, the machine-voice rendering system 108 may arrange/organize the extracted data and enclose portions of the extracted data into one more sub-entities according to pre-defined rules or a template associated with an organizational schema.

The machine-voice rendering 108 may then identify and store, in relation to each of the electronic messages, one or more sub-entities in the structured entity according to the predefined template (Step 210). For example, the structured entity may be further comprised of one or more sub-entities (e.g., nodes) that enclose similarly situated data and further make up the organizational infrastructure of the organizational scheme.

The machine-voice rendering system 108 may receive a query from the user for information contained within one or more of the electronic messages of the user (Step 212). For example, a user in communication with a virtual assistant may request specific information (e.g., fight information, what products were ordered, event reminders, or the like) recited within a recently received email. The machine-voice rendering system 108 may identify an organizational schema corresponding to the query received from the user (Step 214). In this instance, the machine-voice rendering system 108 may analyze the user query for keywords or for the substance (e.g., subject matter) of the query and identify an organizational schema that matches the keywords or substance of the query in order to identify an organizational schema. The machine-voice rendering system 108 may identify one of the electronic messages received at the server in relation to the user corresponding to the identified organizational schema (Step 216). For example, in response to the user query the machine-voice rendering system 108 may identify at least one electronic message that is also associated with the identified organizational schema.

The machine-voice rendering system 108 may additionally look up and identify stored sub-entities stored in relation to the identified electronic message (Step 218). Here, the machine-voice rendering system 108 may identify (e.g., by identifying and parsing xpath data) sub-entities (e.g., nodes) that make up the structured entity and are further stored in one or more storage media devices (e.g., a database) that are in relation to the identified electronic message. The machine-voice rendering system 108 may generate a text-snippet of text data in the one or more sub-entities stored in relation to the identified electronic message (Step 220). Here, the machine-voice rendering system 108 may generate a text-snippet of text data (or data representative of text or other media content) enclosed in the one or more sub-entities that are stored in relation to the identified electronic message. The machine-voice rendering system 108 may produce and play a machine-voice rendering of the generated text-snippet (Step 222). For example, the machine-voice rendering system 108 may produce a user-perceivable audio wave and play said user-perceivable audio wave at a device (e.g., personal computing devices 102 which may comprise a virtual assistant) corresponding to the user.

Figure 3:
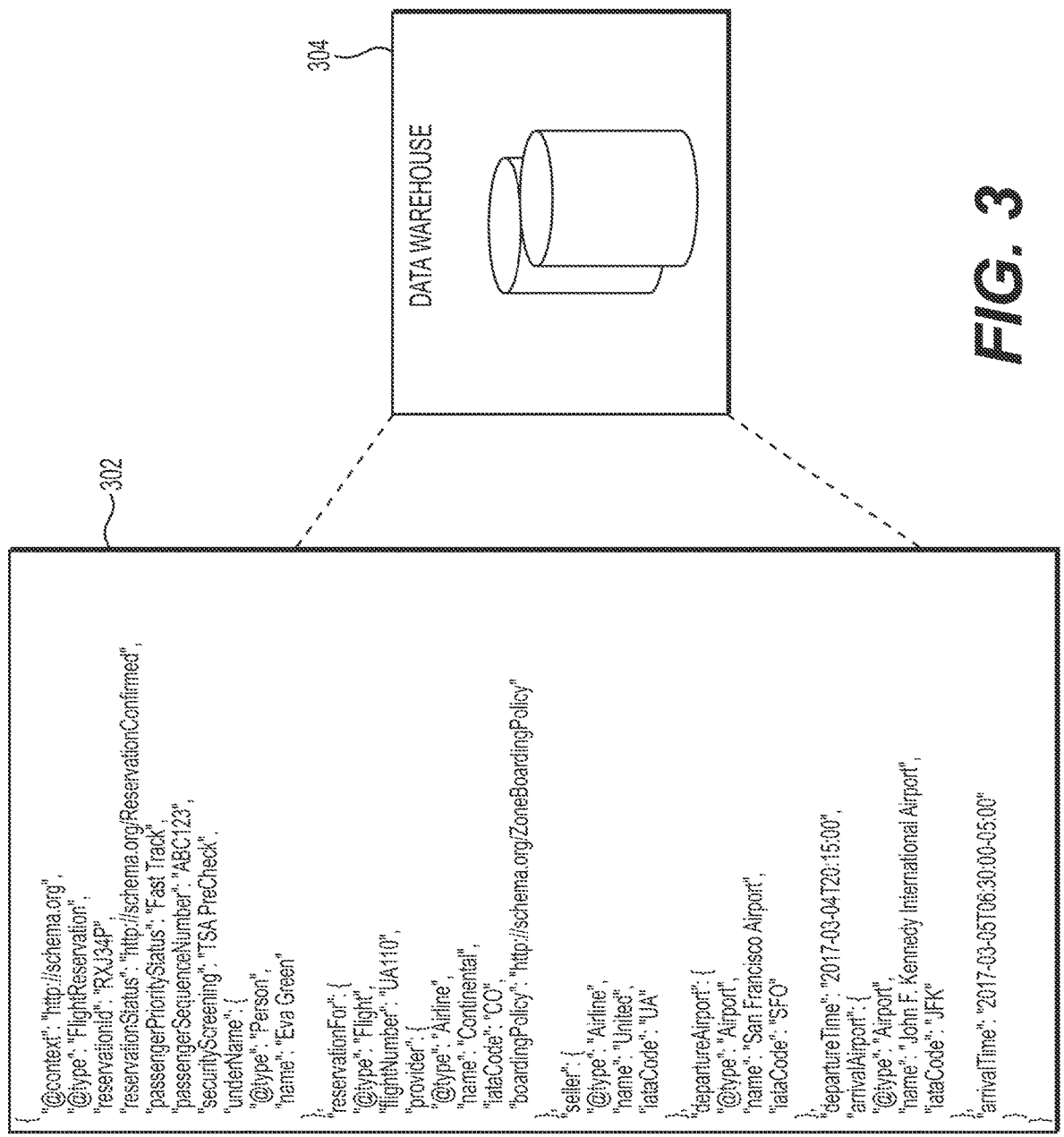
FIG. 3 is a block diagram illustrating a coding scheme for electronic messages stored in a data warehouse of the computer system of FIG. 1.

FIG. 3 is a block diagram illustrating a coding scheme for electronic messages stored in a data warehouse in communication with the machine-voice rendering system 108 of FIG. 1. As shown in FIG. 3, a data warehouse 304 may be any type of database (e.g., relational database) or memory, and may be configured to be in direct communication with the machine-voice rendering system 108. The data warehouse 304 may store various data including data corresponding to electronic messages and coding scheme(s) 302 corresponding to the electronic messages. A coding scheme may comprise a structured entity or a textual snippet generated based on the structured entity. The structured entity may be an organizational schema for electronic messages where the organization of the scheme corresponds to the subject matter of the content in the electronic message.

A structured entity may further be comprised of entities (i.e., specific areas, nodes, or sub-entities within the structured entity) that conform to the organizational scheme of the structured entity and further break down content (e.g., aggregated data from an electronic message) into sub-categories according to location within the electronic message, by subject matter, grammar, syntax, tags, keywords, or the like. Such organization allows content or data to be structured in a manner that makes accessing data and data retrieval useful and predictable by applications, search engines, and queries. The machine-voice rendering system may retrieve relevant entities (i.e., specific areas, nodes, or sub-entities within the structured entity) corresponding to the structured entity based on the specific request made in the user query. The retrieved relevant entities may include message data that is further relevant to the user query.

The extraction module 108A may communicate with and access data in coding scheme 302 and may be configured to automatically extract information from electronic messages (e.g., an email) stored in a data warehouse 304 corresponding to the machine-voice rendering system 108, external data server(s) 106, and/or information received from the personal computing devices 102. The structure module 108B may communicate with and access data in coding scheme(s) 302 and/or data warehouse 308 to execute code for retrieving relevant entities from a structural entity given a user query and generating a text snippet based on the user query and structured entity. Machine-voice module 108C may communicate with and access data in both coding scheme 302 and data warehouse 304 to execute text-to-speech techniques in order to produce a human-perceivable audio output of the text snippet.

FIG. 4 depicts a graphical representation of an electronic message with emphasis being made to data elements that would be relevant to a user requesting a voice rendering of a machine-generated electronic message. Specifically, FIG.

4 depicts a flight booking confirmation email 402, which is meant to be exemplary in nature, as opposed to limiting this disclosure to flight related electronic messaging. Flight booking confirmation email 402 recites various information including a header section titling what the subject of the email is, a sub-header section reciting information informing the reader of the type of identification document(s) are required to travel, a sub-section conveying information specific to the flight booking and specifically emphasis being made to data elements that would be relevant to a user requesting a voice rendering of a machine-generated electronic message (e.g., booking reference number, flight number(s), flight departure/arrival information, passenger identifying information, and the total amount paid). The sub-section may additionally convey information regarding seating arrangements, change flight options, additional products ordered, and pricing information. Flight booking confirmation email 402 additionally conveys a footer section directed to offering ancillary services/products (e.g., endorsements for rental cars and/or hotels). Flight booking confirmation email 402 may be a machine generated email comprised of machine generated text. Flight booking confirmation email 402 may conform to an organizational schema for electronic messages wherein the organization of the scheme corresponds to the subject matter (i.e., flight booking information) of the content in the electronic message. Based on the subject matter of flight booking confirmation email 402 (i.e., flight booking information) a machine-voice rendering system 108 may extract data from the flight booking confirmation email 402 according to an organizational schema specific to machine generated flight related emails via an extraction module 108A and structure module 108B.

Once the extracted data has been converted to a structured entity, the various sections (e.g., header, sub-header, sub-section, footer) of the flight booking confirmation email 402 may be organized in a manner wherein each section is further organized/enclosed into sub-entities that further break down content (e.g., aggregated data from an electronic message) into sub-categories according to location within the electronic message, by subject matter, grammar, syntax, tags, keywords, or the like. Organizing extracted data down to the sub-entity level permits the machine-voice module 108C to execute text-to-speech techniques in order to produce a human-perceivable audio output of a text snippet that is a corresponding response to a user query inquiring about information recited in the flight booking confirmation email 402. For example, if a user asks a personal computing device 102 and/or a virtual assistant "When is my next flight?" the machine-voice module 108C may receive a text-snippet comprising data representative of the data (e.g., flight number(s), flight departure/arrival information, etc.) originally recited in the sub-section of the flight booking confirmation email 402 and further produce a machine-voice rendering of the received text snippet. The machine-voice module 108C may additionally receive more than one text-snippet in response to multiple queries from a user in communication with a personal computing device 102 and/or virtual assistant. For example, a user asks a personal computing device 102 and/or a virtual assistant "when is my next flight?" and the machine-voice module 108C may produce a machine-voice rendering of the received text snippet. The user may then ask a follow-up question, for example, "what is my booking confirmation number?" and the machine-voice module 108C may receive a text-snippet comprising data representative of the data (e.g., booking confirmation number) originally recited in the sub-section of the flight booking confirmation email 402 and further produce a machine-voice rendering of the received text snippet.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine-readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure, the term "server" should be understood to refer to a service point that provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software, for example virtual servers, and one or more database systems and application software that support the services provided by the server. Cloud servers are examples.

For the purposes of this disclosure, a "network" should be understood to refer to a network that may couple devices so that communications may be exchanged, such as between a server and a personal computing device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof Likewise, sub-networks, which may employ differing architectures or may be compliant or compatible with differing protocols, may intemperate within a larger network.

For purposes of this disclosure, a "wireless network" should be understood to couple personal computing devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, 4th or 5th generation (2G, 3G, 4G or 5G) cellular technology, Bluetooth, 802.11b/g/n, or the like. Network access technologies may enable wide area coverage for devices, such as personal computing devices with varying degrees of mobility, for example.

In short, a wireless network may include any type of wireless communication mechanism by which signals may be communicated between devices, such as a personal computing device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a personal computing device may include a computing device capable of sending or receiving signals, such as via a wired or a wireless network. A personal computing device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A personal computing device may vary in terms of capabilities or features. Claimed subject matter is intended to cover a wide range of potential variations, such as a web-enabled personal computing device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display and components for displaying augmented reality objects, for example.

A personal computing device may include or may execute a variety of possible applications, such as a client software application enabling communication with other devices. A personal computing device may also include or execute an application to communicate content, such as, for example, textual content, multimedia content, or the like. A personal computing device may also include or execute an application to perform a variety of possible tasks, such as: browsing, searching, connecting to a network (e.g. the internet), receiving communications (e.g. phone call, emails, text messages, social media communications), streaming or displaying various forms of content, including locally stored or uploaded images and/or video, or games (such as live video calls).

What is claimed is:

1. A computer implemented method comprising:
receiving electronic messages at a server in relation to a user;
determining an organizational schema of each of the plurality of electronic messages as it is received at the server;
extracting data from each of the electronic messages according to a predefined template corresponding to the organizational schema determined for each electronic message, the extracted data limited to sub-entity datatypes of the predefined template;
generating, by machine learning, a structured entity type based on determining a need for new entity types corresponding to new subject matter from the electronic messages, wherein the structured entity type is a template comprising the sub-entity data types;
identifying and storing, in relation to each of the electronic messages, one or more sub-entities in the structured entity according to the predefined template;
receiving a query from the user for information contained within one or more of the electronic messages of the user;
generating a reformulated query based on the query from the user, the reformulated query including semantic equivalent phrasing;
identifying an organizational schema based on the reformatted query;
identifying one of the electronic messages received at the server in relation to the user corresponding to the identified organizational schema;

looking up identified and stored sub-entities stored in relation to the identified electronic message;

generating a text-snippet of text data in the one or more sub-entities stored in relation to the identified electronic message; and producing and playing a machine-voice rendering of the generated text-snippet.

2. The computer implemented method of claim 1 further comprising:

wherein the electronic message is: email, text message, or transcribed video/voice calls.

3. The computer implemented method of claim 1 further comprising:

wherein the query is received via user communication with a virtual assistant.

4. The computer implemented method of claim 1 further comprising:

conducting natural language processing techniques on the received electronic message.

5. The computer implemented method of claim 1 further comprising:

executing text-to-speech techniques in order to produce an human-perceivable audio output of the text snippet.

6. The computer implemented method of claim 1 further comprising:

retrieving sub-entity data in order to generate a text snippet via a structure module.

7. The computer implemented method of claim 1 further comprising:

analyzing the query by executing natural language processing techniques.

8. A system implemented method comprising:

a memory storage device storing instructions and one or more processors configured to execute instructions for:

receiving electronic messages at a server in relation to a user;

determining an organizational schema of each of the plurality of electronic messages as it is received at the server;

extracting data from each of the electronic messages according to a predefined template corresponding to the organizational schema determined for each electronic message, the extracted data limited to sub-entity datatypes of the predefined template;

generating, by machine learning, a structured entity type based on determining a need for new entity types corresponding to new subject matter from the electronic messages, wherein the structured entity type is a template comprising the sub-entity data types;

identifying and storing, in relation to each of the electronic messages, one or more sub-entities in the structured entity according to the template;

receiving a query from the user for information contained within one or more of the electronic messages of the user;

generating a reformulated query based on the query from the user, the reformulated query including semantic equivalent phrasing;

identifying an organizational schema based on the reformatted query;

identifying one of the electronic messages received at the server in relation to the user corresponding to the identified organizational schema;

looking up identified and stored sub-entities stored in relation to the identified electronic message;

generating a text-snippet of text data in the one or more sub-entities stored in relation to the identified electronic message; and producing and playing a machine-voice rendering of the generated text-snippet.

9. The system of claim 8 further comprising:

wherein the electronic message is: email, text message, or transcribed video/voice calls.

10. The system of claim 8 further comprising:

wherein the query is received via user communication with a virtual assistant.

11. The system of claim 8 further comprising:

conducting natural language processing techniques on the received electronic message.

12. The system of claim 8 further comprising:

executing text-to-speech techniques in order to produce an human-perceivable audio output of the text snippet.

13. The system of claim 8 further comprising:

retrieving sub-entity data in order to generate a text snippet via a structure module.

14. The system of claim 8 further comprising:

analyzing the query by executing natural language processing techniques.

15. A non-transitory computer readable medium comprising:

a memory storage device storing and one or more processors configured to execute instructions for:

receiving electronic messages at a server in relation to a user;

determining an organizational schema of each of the plurality of electronic messages as it is received at the server;

extracting data from each of the electronic messages according to a predefined template corresponding to the organizational schema determined for each electronic message, the extracted data limited to sub-entity datatypes of the predefined template;

generating, by machine learning, a structured entity type based on determining a need for new entity types corresponding to new subject matter from the electronic messages, wherein the structured entity type is a template comprising the sub-entity data types;

generating, by machine learning, a structured entity type based on determining new subject matter from the electronic messages;

identifying and storing, in relation to each of the electronic messages, one or more sub-entities in the structured entity according to the template;

receiving a query from the user for information contained within one or more of the electronic messages of the user;

generating a reformulated query based on the query from the user, the reformulated query including semantic equivalent phrasing;

identifying an organizational schema based on the reformatted query;

identifying one of the electronic messages received at the server in relation to the user corresponding to the identified organizational schema;

looking up identified and stored sub-entities stored in relation to the identified electronic message;

generating a text-snippet of text data in the one or more sub-entities stored in relation to the identified electronic message; and producing and playing a machine-voice rendering of the generated text-snippet.

16. The non-transitory computer readable medium of claim 15 further comprising:
   wherein the electronic message is: email, text message, or transcribed video/voice calls.

17. The non-transitory computer readable medium of claim 15 further comprising:
   wherein the query is received via user communication with a virtual assistant.

18. The non-transitory computer readable medium of claim 15 further comprising:
   conducting natural language processing techniques on the received electronic message.

19. The non-transitory computer readable medium of claim 15 further comprising:
   executing text-to-speech techniques in order to produce an human-perceivable audio output of the text snippet.

20. The non-transitory computer readable medium of claim 15 further comprising:
   retrieving sub-entity data in order to generate a text snippet via a structure module.

* * * * *